United States Patent [19]

Peterson et al.

[11] Patent Number: 5,754,724
[45] Date of Patent: May 19, 1998

[54] FIBER OPTIC SUPPORT APPARATUS

[75] Inventors: Wayne L. Peterson, Edison; Ronald D. Bechamps, Hightstown, both of N.J.

[73] Assignee: Antec Corporation, Rolling Meadows, Ill.

[21] Appl. No.: 745,266

[22] Filed: Nov. 8, 1996

[51] Int. Cl.$^6$ .................................................. G02B 6/36
[52] U.S. Cl. .............................................. 385/135; 385/136
[58] Field of Search ......................................... 385/134–137

[56] References Cited

U.S. PATENT DOCUMENTS

| | | | |
|---|---|---|---|
| 4,702,551 | 10/1987 | Coulomba | 385/135 |
| 4,708,430 | 11/1987 | Donaldson et al. | 385/134 |
| 4,805,979 | 2/1989 | Bossard et al. | 385/135 |
| 4,927,227 | 5/1990 | Bensel, III et al. | 385/135 |
| 4,961,623 | 10/1990 | Midkiff et al. | 385/135 X |
| 5,241,617 | 8/1993 | Peacock et al. | 385/135 |
| 5,278,933 | 1/1994 | Hunsinger et al. | 385/135 |
| 5,495,549 | 2/1996 | Schneider et al. | 385/135 |

*Primary Examiner*—John D. Lee

[57] ABSTRACT

Support or frame for supporting one or more interconnections between optical fibers, the support is provided with an indentation for receiving buffer tubes of one of the optical fiber cables providing one of the interconnected optical fibers. An assembly or kit including the foregoing support, one or more fusion splice organizers, one or more bulkhead members for receiving and mounting an optical fiber connector for interconnecting a pair of optical fibers, one or more fasteners for fastening the bulkhead member or members to the support, and one or more fasteners for fastening the support to a support member. Alternative support or frame including a clamp for clamping one or more optical fiber splice trays. An enclosure may be included for being fastened around the support or frames to provide mechanical and environmental protection to the support and the optical fiber interconnections.

47 Claims, 5 Drawing Sheets

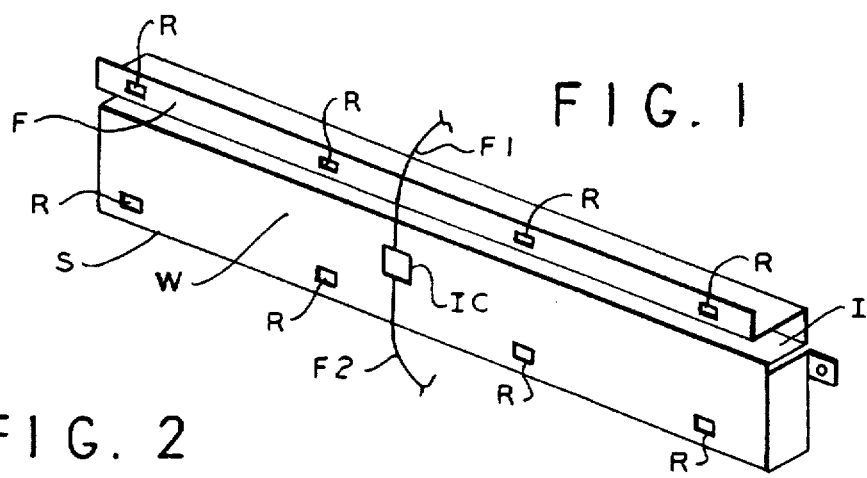
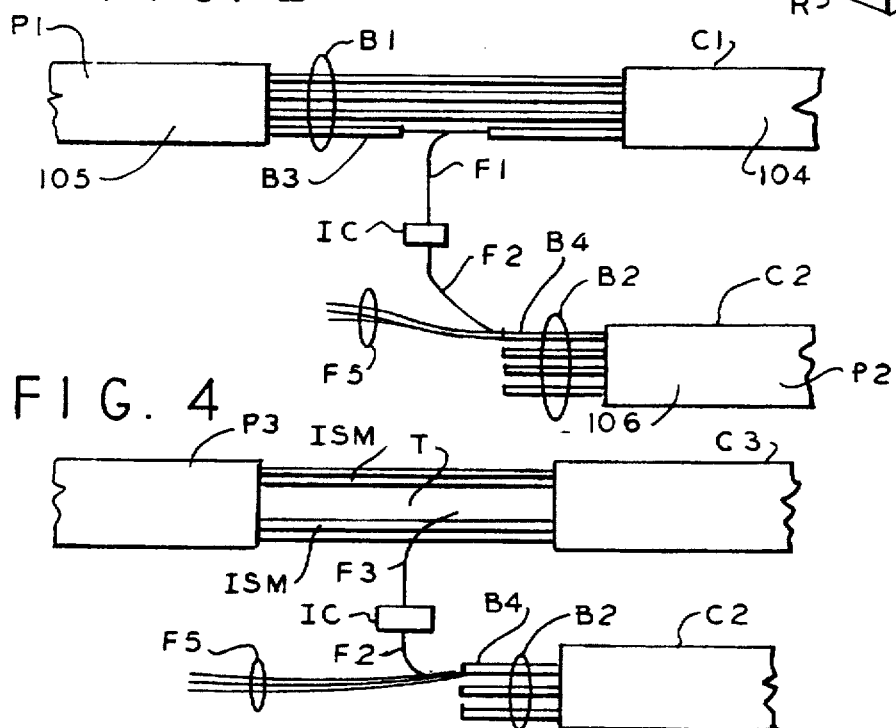
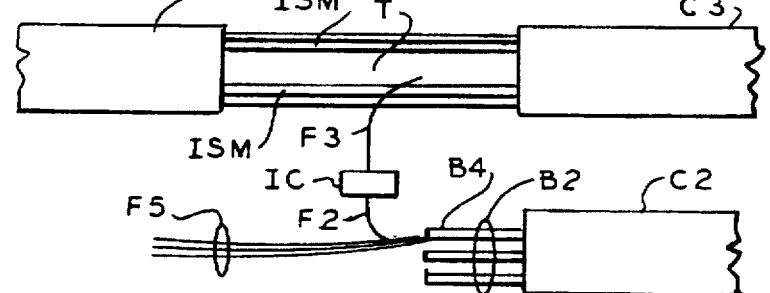
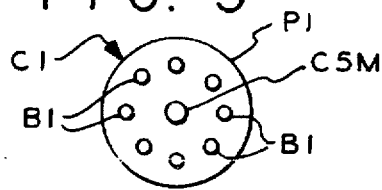
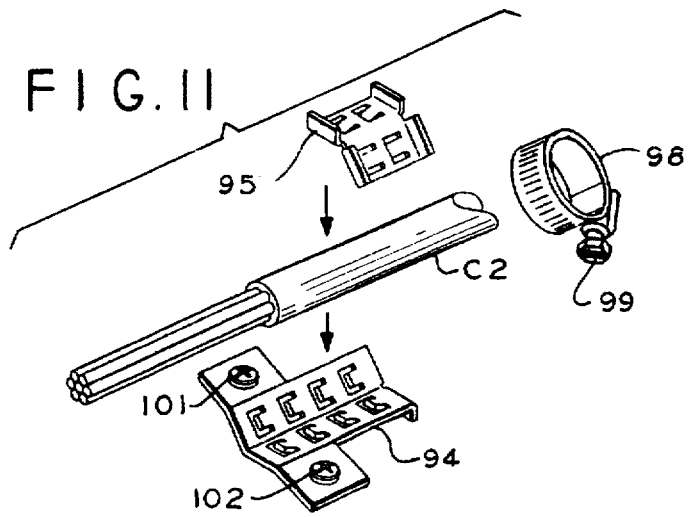
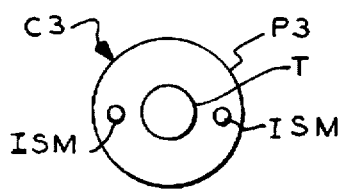

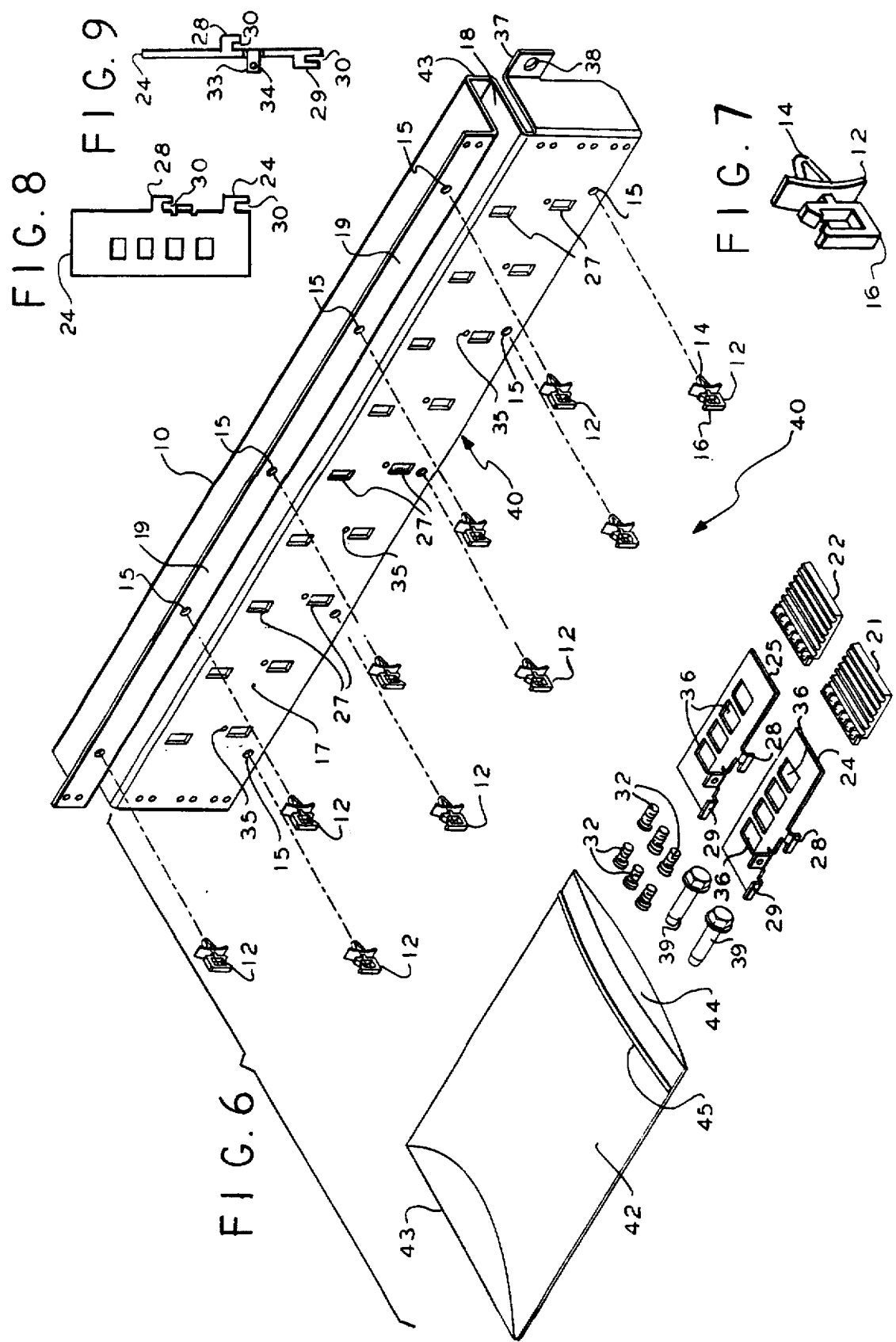

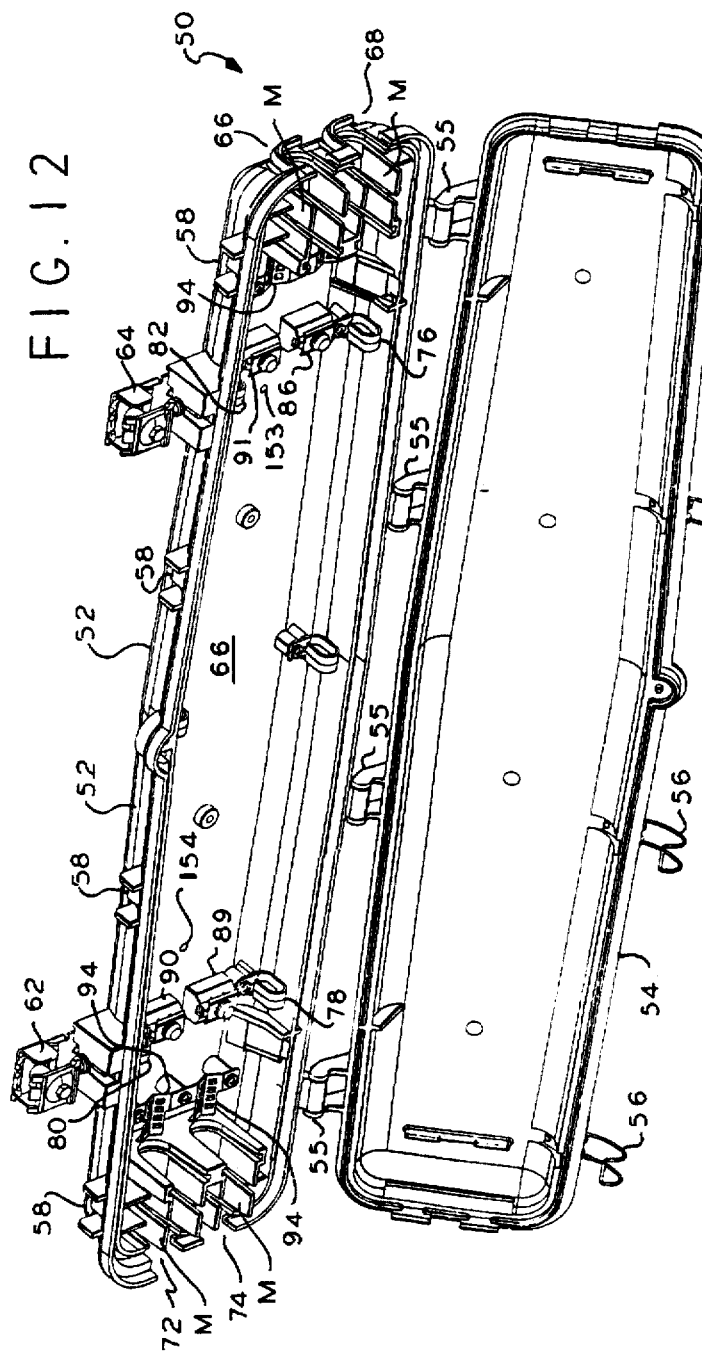
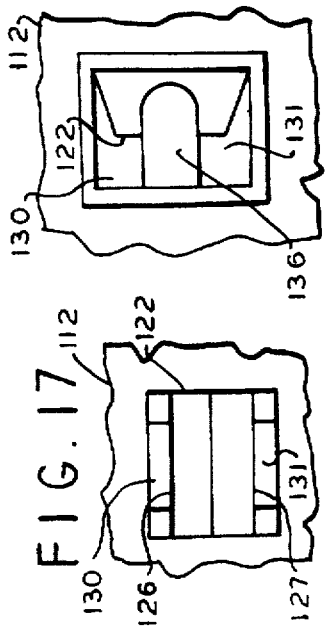
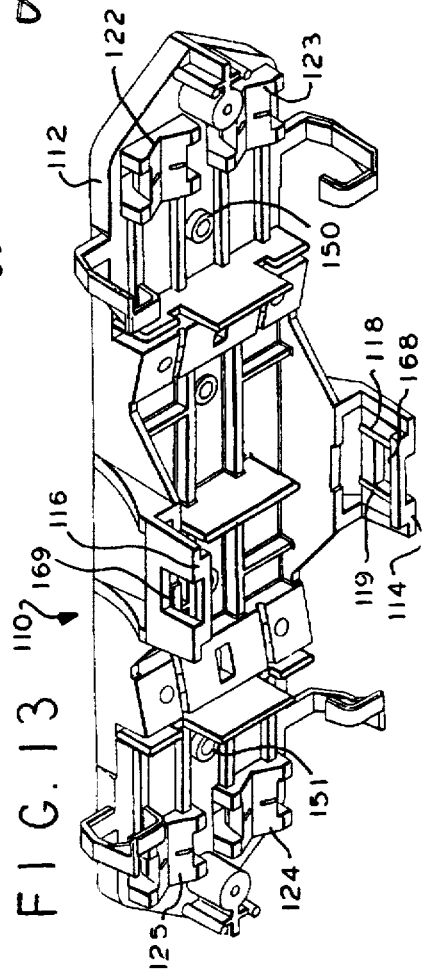

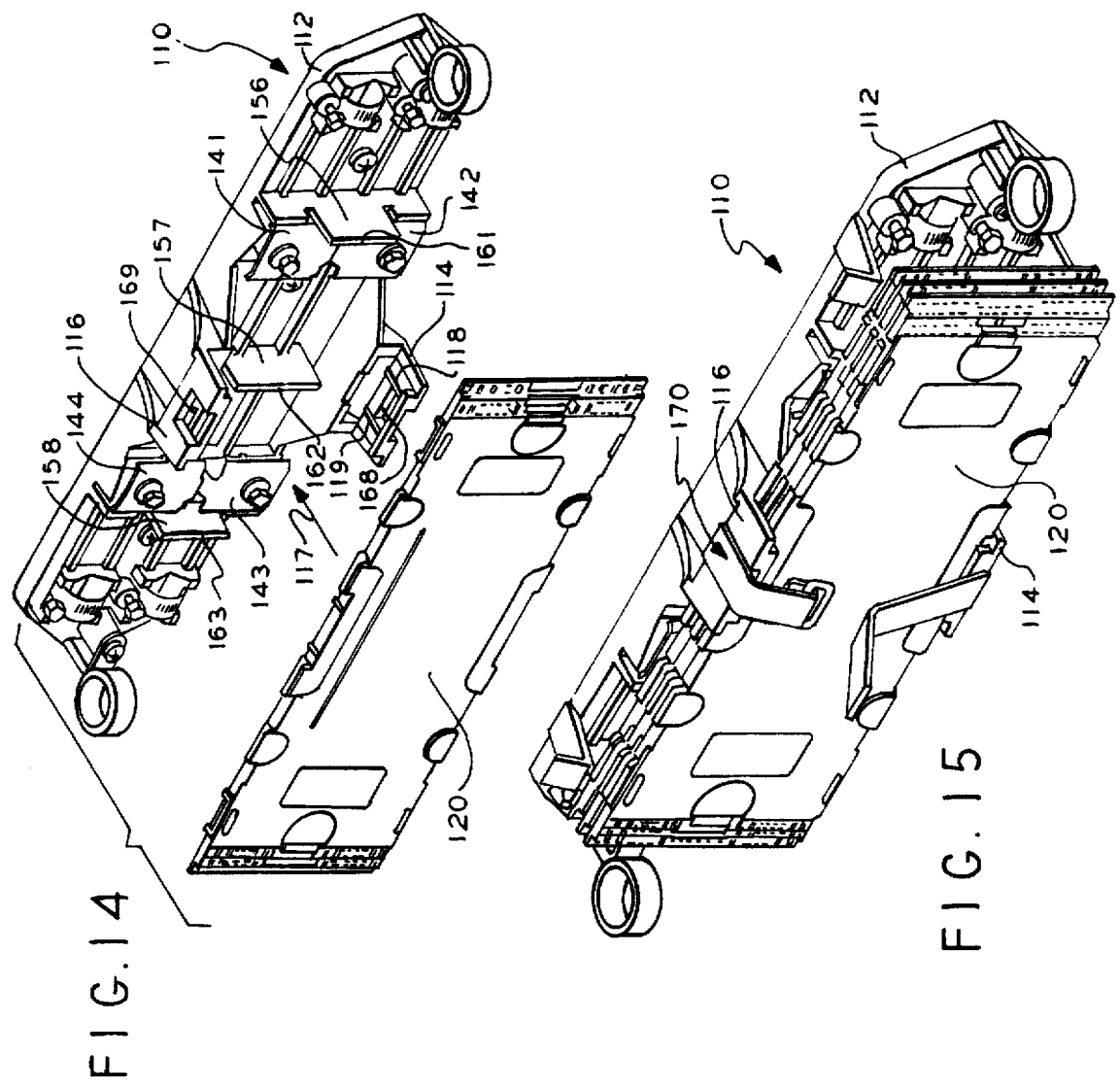
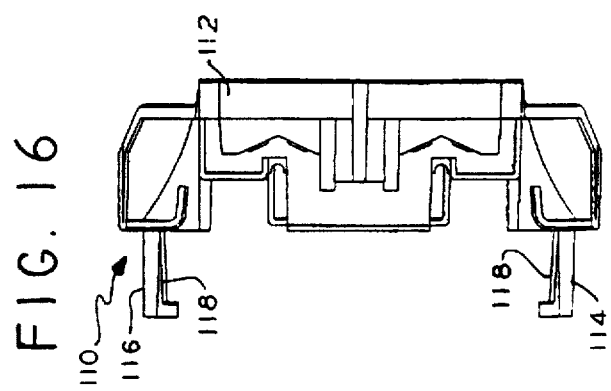

FIBER OPTIC SUPPORT APPARATUS

FIELD OF THE INVENTION

This invention relates generally to apparatus for supporting one or more interconnections between optical fibers, to an assembly or kit of apparatus for supporting one or more interconnections between optical fibers, and further relates to apparatus for supporting and enclosing one or more interconnections between optical fibers and for providing mechanical and environmental protection to the interconnections; the support and enclosure apparatus of the present invention is particularly useful as aerial apparatus for supporting and enclosing interconnections between optical fibers.

Several of such apparatus are known to the art, for example, the apparatus disclosed in U.S. Pat. No. 5,495,549, entitled OPTICAL FIBER SPLICE CLOSURE, patented Feb. 27, 1996, and assigned to the same assignee as the present invention. U.S. Pat. No. 5,495,549 hereby is incorporated herein by reference as if fully reproduced herein, and it is referred to hereinafter as the "'549 patent." However, there still exists a need in the art for relatively easy to manufacture and relatively inexpensive apparatus for supporting interconnections between optical fibers and apparatus for supporting and enclosing interconnection between optical fibers.

SUMMARY OF THE INVENTION

It is the object of the present invention to satisfy the foregoing need in the art.

Apparatus satisfying such need and embodying the present invention may include a support or frame for supporting one or more interconnections between optical fibers and which, in one embodiment, includes a support or frame provided with an indentation for receiving at least one internal tube containing a plurality of optical fibers and at least one internal support member contained in an optical fiber cable, and which in another embodiment includes a support or frame provided with a clamp for clamping one or more optical splice trays containing interconnections between optical fibers.

Apparatus further satisfying such need and embodying the present invention may include an assembly or kit including the foregoing support, one or more fusion splice organizers, one or more bulkhead members for receiving and mounting an optical fiber connector for interconnecting a pair of optical fibers, one or more fasteners for fastening the bulkhead member or members to the support, and one or more fasteners for fastening the support to a support member.

Still further, apparatus satisfying the foregoing need and embodying the present invention may include variously the foregoing supports or frames and an enclosure for being fastened around the support to provide mechanical and environmental protection to the support and the optical fiber interconnections.

DESCRIPTION OF THE DRAWINGS

FIGS. 1, 2 and 4 are diagrammatical illustrations illustrating certain features or aspects of the various embodiments of the present invention;

FIGS. 3 and 5 are diagrammatical transverse cross-sectional views of optical fiber cables which may be used in the practice of the present invention;

FIG. 6 is an exploded view showing both the first and second embodiments of the present invention;

FIG. 7 is an enlarged view of a routing member of the present invention;

FIGS. 8 and 9 are, respectively, side and rear views of a bulkhead member for receiving and mounting an optical fiber connector;

FIG. 11 is an exploded view illustrating the protective sheath mounting aspect of the present invention;

FIG. 12 is a perspective view of the enclosure of the apparatus of the present invention shown in the open position; and FIG. 13 is a perspective view of a further frame or support of the present invention for supporting one or more optical splice trays containing one or more interconnections between optical fibers;

FIG. 14 is a perspective view showing the frame or support of FIG. 13 and an optical fiber splice tray to be mounted in clamping engagement with the frame or support;

FIG. 15 is a perspective view showing a plurality of optical fiber splice trays mounted in clamping engagement with the frame or support of FIGS. 13 and 14;

FIG. 16 is a right end view of the frame or support shown in FIG. 13;

FIG. 17 is a partial front elevational view of the support base of the frame or support shown in FIG. 13 and showing detailed structure of an inwardly extending V-shaped member for receiving optical fiber cables of different diameters; and FIG. 18 is a rear view, in perspective, of the structure shown in FIG. 17.

DESCRIPTION OF THE PREFERRED EMBODIMENTS

Figure 10:
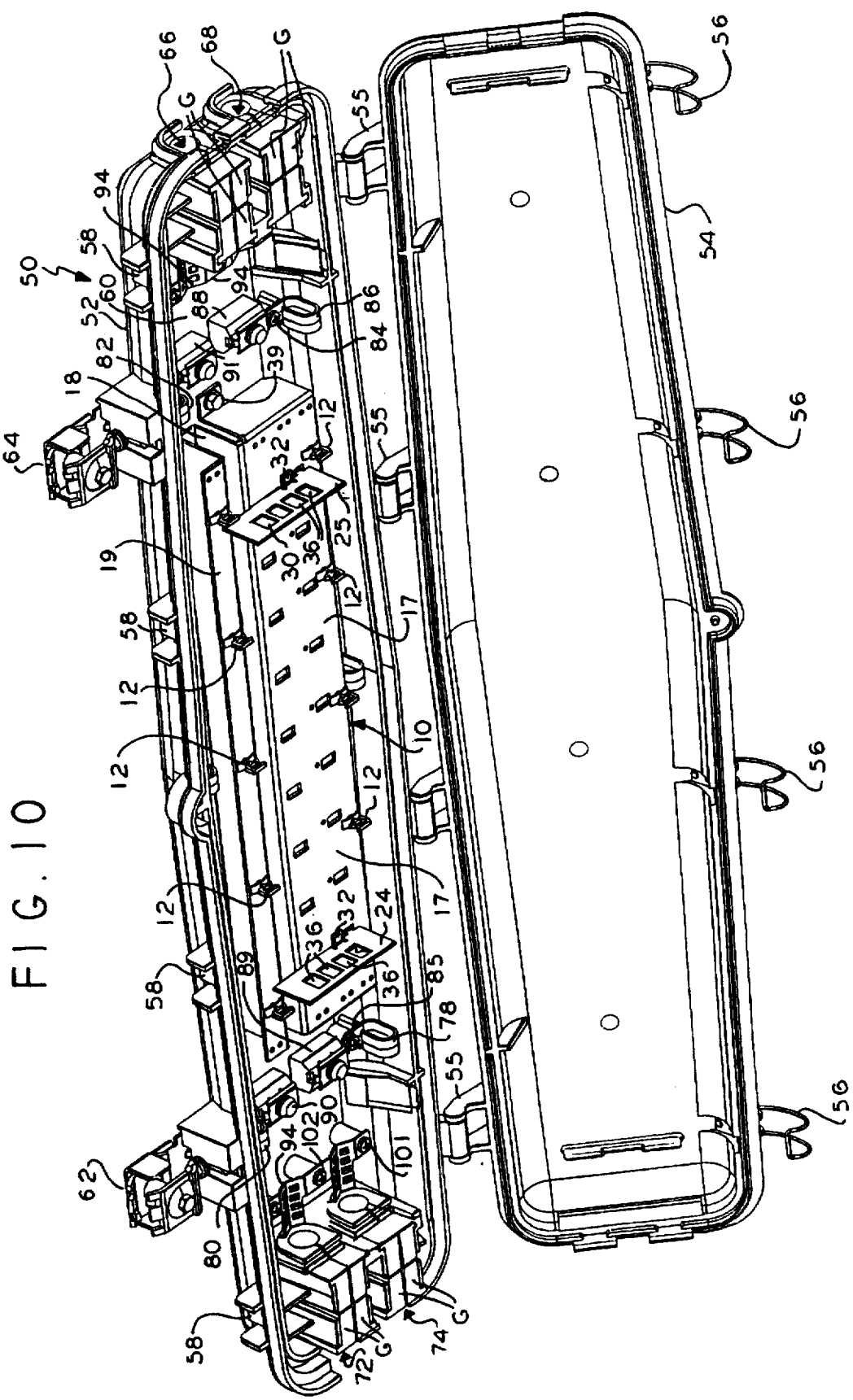
FIG. 10 is a view of a third embodiment of the present invention enclosure in the open position.

Certain aspects or features of the various embodiments of the present invention are illustrated diagrammatically in FIGS. 1 and 2. Referring first to FIG. 2 by way of background, a first optical cable C1 and a second optical cable C2 are shown. The first optical fiber cable C1 may be an express optical fiber cable, and the optical fiber cable C2 may be a drop optical fiber cable. The first optical fiber cable C1 includes an outer protective sheath P1 surrounding a plurality of buffer tubes B1 each containing a plurality of optical fibers. The optical fiber cable C2 includes an outer protective sheath P2 containing a plurality of buffer tubes B2 each containing a plurality of optical fibers. As shown in FIG. 2, a portion of the outer protective sheath P1 of optical fiber cable C1 has been removed to expose the buffer tubes B1. Buffer tube B3, of plurality of buffer tubes B1, has been opened and an optical fiber F1 has been taken out of buffer tube B3 for interconnection to optical fiber F2 taken from buffer tube B4 included in plurality of buffer tubes B2 of optical fiber cable C2. The interconnection between optical fibers F1 and F2 is indicated diagrammatically in FIG. 2 as IC, and it will be understood that optical fiber interconnection IC may be either a fusion splice interconnection (e.g. single fusion splice interconnection or mass ribbon fusion splice interconnection) or may be an interconnection provided by one of several optical fiber connectors known to the art for receiving two optical fibers and for mechanically and optically interconnecting such fibers. An example of such optical fiber connector is the OptoClip connector provided by Molex Fiber Optic, Inc., 5224 Katrine Avenue, Downers Grove, Ill. 60515. A diagrammatical transverse cross-sectional view of optical fiber cable C1 is shown in FIG. 3.

In addition to the outer protective sheath P1 and plurality of buffer cables B1, the optical fiber cable C1 includes a central strength member CSM. It will be understood that a transverse cross-sectional view of optical fiber cable C2 would look the same as that shown in FIG. 3 for optical fiber cable C1. Alternative to the optical fiber cables C1 and C2 shown in FIG. 2, and the transverse cross-sectional view thereof shown in FIG. 3, other optical fiber cables are known to the art such as optical fiber cable C3 shown in FIG. 4; a diagrammatical transverse cross-sectional view of optical fiber cable C3 is shown in FIG. 5. Referring to FIGS. 4 and 5, the optical fiber cable C3 includes an outer protective sheath P3, a central core tube T containing a plurality of optical fibers and a pair of internal strength members ISM. Referring to the interconnection illustrated diagrammatically in FIG. 4, a portion of the outer protective sheath P3 is removed to expose the internal strength members ISM and the center core tube T and the center core tube T is opened to remove optical fiber F3 for interconnection with optical fiber F2 of optical fiber cable C2 in interconnection IC which may be any one of the same types of interconnections described above with regard to FIG. 2. Further alternatively, it will be understood that the optical fiber cable C2 also may be of the same configuration as optical fiber C3 particularly as shown in cross-sectional view in FIG. 5.

Referring now to FIG. 1, the present invention includes a frame or support S including a substantially planar mounting wall W on which one or more interconnections between optical fibers are mounted, a substantially planar flange F substantially planar with the mounting wall W and an intermediate portion intermediate the mounting wall W and flange F which extends inwardly from the mounting wall W and flange F and which intermediate portion provides an indentation I. By way of illustration, interconnection IC between optical fibers F1 and F2 shown in FIG. 2 and described above also is shown diagrammatically in FIG. 1 as being mounted to the mounting wall W, and it will be understood that the indentation I (FIG. 1) is for receiving buffer tubes contained in an optical fiber cable, e.g. buffer tubes B1 contained in optical fiber cable C1 shown in FIG. 2. The frame or support S is for being mounted to a suitable support member (not shown) as described by way of example below in connection with FIG. 10. The frame or support S may include a plurality of routing members R for receiving and mounting a plurality of optical fibers (e.g. optical fibers F5 from optical fiber cable C2 in FIG. 2) on the frame or support S. From FIG. 1, it will be noted that a portion of the routing members R are provided on the flange F and a portion of the routing members R are provided on the mounting wall W.

A frame or support 10, substantially the same as frame or support S of FIG. 1, is shown in FIG. 6 and comprises the first embodiment of the present invention. The frame or support 10 includes a lower portion, as viewed in FIG. 6, providing a mounting wall 17, an upper portion providing a flange 19, and an intermediate portion intermediate the upper and lower portions providing an inwardly extending indentation 18 extending inwardly from the mounting wall 17 and the flange 19. The mounting wall 17 is for supporting one or more interconnections between one or more pairs of optical fibers contained in optical fiber cables (not shown in FIG. 6) but as described above in connection with FIGS. 1 and 2. In addition to the frame or support 10, the first embodiment of the present invention may include a plurality of routing members 12 which may be mounted to the support 10 by the integrally formed plug-in or snap-fit members 14, note the enlarged view of a routing member 12 and snap-fit member 14 shown in FIG. 7. The support 10 may be provided with a plurality of openings 15 for wedgedly receiving the snap-fit members 14. The routing members 12 include an integrally formed generally U-shaped portion 16, note FIG. 7, for receiving and routing optical fibers, e.g. optical fibers F5 from optical fiber cable C2 shown in FIG. 2, around the frame or support 10 to store such optical fibers on the support 10. The indentation 18 extending inwardly across the entirety of its upper portion of the support 10, as viewed in FIG. 6, is for receiving the buffer tubes, e.g. buffer tubes B1 from optical fiber cable C1 shown in FIG. 2. By way of further example, one, or both, of the fusion splice organizers 21 and 22 of the type known to the art (e.g. single fusion splice organizer, mass ribbon fusion splice organizer) and shown in FIG. 6, may be mounted adhesively to the mounting wall 17. The fusion splice organizers 21 and 22 are provided with a plurality of substantially parallel indentations as shown in FIG. 6 for receiving fusion splices between optical fibers in the manner known to the art. Alternatively, and by way of further example, one or both of the bulkhead members 24 and 25 shown in FIGS. 6, 8 and 9 may be mounted to the mounting wall 17. The mounting wall 17 may be provided with pairs of vertically (as viewed in FIG. 6) offset or staggered openings 27 and the bulkhead members 24 and 25, note representative bulkhead member 24, FIGS. 8 and 9, may be provided with pairs of offset or staggered mounting members 28 and 29. It will be understood from FIGS. 8 and 9, that the mounting members 28 and 29 provide openings 30 which permit the bulkhead members, upon the mounting members 28 and 29 being inserted into one of the pairs of staggered or offset openings 27, to be moved downwardly as viewed in FIG. 6, with respect to the frame 10, to cause the staggered mounting members 28 and 29 to be forced into wedged engagement with the mounting wall 17 to thereby mount the bulkhead members to the mounting wall. From FIG. 9, it will be noted, with respect to representative bulkhead member 24, that the bulkhead members may be further provided with an outwardly extending mounting member 33 provided with an opening 34. The bulkhead members may be further mounted to the mounting wall 17 by one of the retaining pins 32, FIG. 6, which may be inserted through the bulkhead opening 34 and inserted into one of the openings 35 extending through the mounting wall 17. The retaining pins 32 may be of the type known to the art including a plurality of outwardly extending circular or annular members axially aligned and for being wedged into the openings 35. The bulkhead members 24 and 25 are each provided with a plurality of rectangular openings 36 for wedgedly receiving a plurality of optical fiber connectors of the type known to the art and referred to above for receiving and mechanically and optically interconnecting a pair of optical fibers. An example of such prior art optical fiber connectors is the OptoClip optical fiber connector noted above. Such OptoClip connector, as is known, is provided on opposed sides with outwardly extending spring-like members which permit the connector to be wedgedly received in the openings 36 formed in the bulkhead members 24 and 25.

The frame 10 is provided at its opposed ends, as oriented in FIG. 6, with a pair of outwardly extending mounting members 37, only one shown in FIG. 6, which mounting members are provided with an opening 38. The frame or support 10 may be mounted to a suitable support member by a pair of self-tapping bolts 39 which are inserted through the openings 38 and threadedly engaged with such suitable support member. An example of the mounting of the frame or support 10 to a suitable support member is described in detail below in connection with the third embodiment of the present invention shown in FIG. 10. The frame 10, FIG. 6, may be made of a suitable metal and suitably shaped, such as by bending, into the shape or configuration shown in FIG. 6 and described in detail above.

The assembly or kit comprising the second embodiment of the present invention is shown in FIG. 6 and indicated by general numerical designation 40. Assembly or kit 40 may include the above-described frame or support 10, routing members 12, fusion splice organizers 21 and 22, bulkhead members 24 and 25, retaining pins 32, self-tapping bolts 39, and also may include a pouch or container 42 for receiving the fusion splice organizers 21 and 22, bulkhead members 24 and 25, retaining pins 32 and self-tapping bolts 39. Container 42 may be made from a suitable heat-sealable plastic and may be heat sealed at the bottom end 43 and provided at its opposed top end 44, shown open in FIG. 6, with snap-fit fastening means indicated diagrammatically by the double line 45, for closing the top end; such snap-fit means 45 may be of the type known to the art including an outwardly extending rib or projection and an opposed indentation for receiving the projection or rib in a snap fit. The above-described elements comprising the assembly or kit 40, except for the container 42, are assembled and perform the same functions as described above for such elements.

Referring now to FIG. 10, a third embodiment of the present invention is shown. This embodiment includes the frame or support 10 shown in FIG. 6 and described above and an openable and closable enclosure indicated by general numerical designation 50. The enclosure 50 shown separately in FIG. 12, includes a base 52 and a cover 54 mounted hingedly to the base 52 by suitable hinge members 55. The cover 54 is provided with a plurality of spring fastening members 56 which engage spring fastening member receivers 58 formed on the base 52 and which receive the spring fasteners 56 in a snap fit to fasten the cover 54 closed over the frame 10 and over optical fiber interconnections (not shown in FIG. 10) mounted on the mounting wall 17 of the frame 10 to provide the frame and such optical fiber interconnections with mechanical and environmental protection in the same manner described in the '549 patent for the cover or enclosure 16.

The enclosure base 52, FIG. 10, includes an interior mounting wall 60 (best seen in FIG. 11) to which the frame 10, in this embodiment, is mounted by the self-tapping screws 39 described above, one of the self-tapping screws 39 being shown in FIG. 10. The bulkhead members 24 and 25 are shown mounted to the mounting wall 17 of the support 10 in FIG. 10 as described above utilizing the staggered bulkhead mounting members 28 and 29, FIGS. 6, 8 and 9, and the retaining pins 32 shown in FIG. 6, two of the retaining pins 32 are shown in FIG. 10. The routing members 12, shown in FIG. 6 and described above, are shown mounted to the frame or support 10 in FIG. 10 with a portion of the routing members 12 shown mounted to the lower portion of the mounting wall 17 and a portion of the routing members 12 shown mounted to the flange 19. Although neither of the fusion splice organizers 21 and 22 shown in FIG. 6 and described above is shown in FIG. 10, it will be understood that the rear surfaces of the fusion splice organizers 21 and 22 (FIG. 6) may be provided with a suitable pressure sensitive adhesive which may be temporarily covered by a suitable release layer or film and upon the release layer or film being removed the fusion splice organizers 21 and 22 may be mounted adhesively to the mounting wall 17 of the frame or support 10.

The enclosure base 52 may be provided with a pair of expandable and contractible strand clamping members 62 and 64 for mounting the enclosure 50 aerially to a metal cable or strand (not shown) extending between poles. The strand clamping members 62 and 64 may be substantially the same as the expandable and contractible strand clamping members 57 and 58 shown in FIG. 1 of the '549 patent and one of which, clamping member 58, is shown in detail in FIG. 5 of the '549 patent.

The enclosure base 52, FIG. 10, may be provided at its rightward end, as viewed in FIG. 10, with a pair of optical fiber cable entry/exit ports indicated by general numerical designations 66 and 68. The leftward end of the enclosure base 52, as viewed in FIG. 10, may be provided with a pair of optical fiber cable entry/exit ports indicated by general numerical designation 72 and 74. The entry/exit ports 66 and 68 and 72 and 74 may be substantially the same as the optical fiber cable entry/exit ports 18, 19 and 20 and 21 and 22 and 23 shown in FIG. 1 of the '549 patent and described in detail in such patent. More particularly, it will be understood that the entry/exit ports 66 and 68 and 72 and 74 shown in FIG. 10 may include pairs G of self-sizing grommets such as the pair of self-sizing grommets 120 and 121 shown in FIG. 12 of the '549 patent and described in detail in the '549 patent. Such self-sizing grommets sealingly engage optical fiber cables entering and exiting the entry/exit ports 66, 68, 72 and 74 of FIG. 10 in the manner taught in detail in the '549 patent. Referring to FIG. 12, it will be understood that the entry/exit ports 66, 68, 72 and 74 are provided with pairs of self-sizing grommet receiving members M complementary in shape to the pairs of self-sizing grommets G.

Mounted to the interior mounting wall 60, FIGS. 11 and 12, of the enclosure base 52 are a plurality of buffer tube routing members 76, 78, 80 and 82 for receiving and routing around the interior mounting wall 60 a plurality of buffer tubes such as the buffer tubes B2 of the optical fiber cable C2 shown in FIG. 2. The routing members 76 . . . 82 may be suitably mounted to the interior mounting wall 60 by suitable self-tapping screws such as screws 84 and 85 shown mounting routing members 76 and 78 to the interior mounting wall 60 in FIG. 10.

Further, also mounted to the interior mounting wall 60 (FIGS. 10 AND 12) of the enclosure base 52 are a plurality of mounting members 88, 89, 90 and 91 for receiving and mounting to the enclosure base 52 the internal strength members (CSM and ISM of FIGS. 3 and 5) of the optical fiber cables entering and exiting the entry/exit ports 66, 68, 72 and 74; the mounting members 88 . . . 91 (FIG. 10) may be mounted to the interior mounting wall 60 by suitable self-tapping screws. Such mounting members may be substantially the same as the central strength mounting member 49 shown in FIG. 4 of the '549 patent and described therein for mounting the central strength member 32 of the optical fiber cable 27 to the frame 12. Such mounting of the internal strength members, as is known, provides strain relief to optical fiber interconnections mounted on the mounting wall 17 of the frame or support 10.

Still further, the interior mounting wall 60 of the enclosure base 52 of the present invention, FIGS. 10 and 12, may be provided with a plurality of protective sheath clamping members each including two sheath clamping member elements or brackets such as the clamping protective sheath clamping elements 94 and 95 shown in FIG. 11. The protective sheath clamping elements 94 are mounted to the interior mounting wall 60 of the enclosure base 52 as is best seen in the leftward portions of FIGS. 10 and 12. Referring further to FIG. 11, an optical fiber cable, which may be optical fiber cable C2 shown in FIG. 2, after entering one of the entry/exit ports noted above, may be placed between the protective sheath clamping elements 94 and 95 as indicated by the arrows in FIG. 11 after which a suitable pipe or hose clamp such as pipe hose clamp 98 shown in FIG. 11, is placed over the protective sheath mounting elements 94 and 95 and fastened thereover and thereby over the optical fiber cable C2 by rotation of the threaded member 99 shown in FIG. 11 in the manner known to the art. The protective sheath mounting member elements 94 may be suitably mounted to the internal mounting wall 60 of the enclosure base 52 by suitable self-tapping screws 101 and 102.

Generally it will be understood that in the third embodiment of the present invention illustrated in FIG. 10, and also referring to FIG. 2, may be utilized, by way of example, to mount optical fiber interconnections between the optical fiber cable C1 and optical fiber cable C2 of FIG. 2 on the mounting wall 17 of the frame or support 10. As noted above with regard to FIG. 2, the optical fiber cable C1 may be an express optical fiber cable, and the optical fiber cable C2 may be a drop optical fiber cable. The portions 104 and 105 of the optical fiber cable C1 of FIG. 2 will be sealingly received and reside in the respective entry/exit ports 66 and 72 and the plurality of buffer tubes B1, FIG. 2, will be received in the indentation 18 provided in the intermediate portion of the frame or support 10, FIG. 10. The portion 106 of the optical fiber cable C2 of FIG. 2 will be sealingly received and will reside in the entry/exit port 68 shown in FIG. 10. Thereafter, and by way of further example and referring to the bulkhead members 24 and 25 shown in FIG. 10, the optical fibers F2 and F1 shown in FIG. 2 may be inserted into a suitable optical fiber connector of the type described above and interconnected therein and such optical fiber connector may be wedgedly received in one of the openings 36 provided in one of the bulkhead members to mount the interconnection between the optical fibers F2 and F1 on the mounting wall 17 of the frame or support 10. Alternatively, upon the interconnection between the optical fibers F2 and F3, FIG. 2, being a fusion splice, either or both of the fusion splice organizers 21 and 22, FIG. 6, may be mounted adhesively to the mounting wall 17 of the support 10, and the fusion splice between such optical fibers will be received in one of the indentations provided in the fusion splice organizers as described above. The optical fibers F5, of the optical fiber cable C2 of the FIG. 2, will be inserted into the routing members 12 and routed around and stored on the frame or support 10. The buffer tubes B2, FIG. 2, of the optical fiber cable C2, may be received in the routing members 76, 78, 80 and 82 to route such buffer tubes around the interior mounting wall 60 of the enclosure base 52 and to thereby store such buffer tubes on the mounting wall. Referring again generally to FIG. 10, and to the third embodiment of the present invention, it will be understood that in addition to having a drop optical fiber cable enter the entry/exit port 68 of the enclosure base 52, a second drop optical fiber cable may enter the entry/exit port 74 and one or more of its optical fibers may be interconnected with optical fibers from an express optical fiber cable entering and exiting the entry/exit ports 66 and 72, and such interconnections also may be mounted to the mounting wall 17 of the support 10 as described above.

The enclosure 50 may be made from a suitable plastic such as a suitable ABS/PVC blend and suitably molded by molding techniques known to the art such as injection molding.

A further frame or support embodiment of the present invention for supporting one or more interconnections between one or more optical fibers is shown in FIGS. 13–18 and indicated by general numerical designation 110. The frame or support 110, FIG. 13, includes a base support 112 and a pair of opposed flexible clamping members 114 and 116 extending outwardly from the support base and spaced apart sufficiently to receive an optical fiber splice tray therebetween in clamping engagement upon an optical fiber splice tray, such as tray 120 shown in FIG. 14, being forced therebetween as indicated by the arrow 117 in FIG. 14. Optical fiber splice tray 120 may be, for example, the optical fiber splice tray disclosed in U.S. Pat. No. 5,428,705, entitled APPARATUS FOR STORING AND ORGANIZING SPLICED OPTICAL FIBERS, patented Jun. 27, 1995, Eric J. Hermsen et al. inventors, and assigned to the same assignee as the present invention. This patent hereby is incorporated by reference as if fully reproduced herein. As disclosed in the incorporated patent, the optical fiber splice tray 120 is for containing one or more fusion splices, or mechanical splices, between one or more optical fibers. The clamping members 114 and 116, note clamping member 114 shown in FIG. 13, and the side views of clamping members 114 and 116 shown in FIG. 16, are each provided with a pair of inwardly extending engaging members 118 and 119 for engaging the optical fiber splice trays, particularly the top and bottom edges thereof, as viewed in FIGS. 14 and 15. The pairs of engaging members 118 and 119 provided respectively on the clamping members 114 and 116 are spaced apart and aligned opposite each other. More particularly, it will be understood, from the side views of the engaging members 118 shown in FIG. 16, that such pairs of engaging members extend inwardly towards each other and taper inwardly outwardly from the support base 112 to cause the engaging members 118 and 119 to engage the top edges of the optical fiber splice trays 120 in clamping engagement as the clamping members 114 and 116 flex increasingly outwardly away from each other as additional optical fiber splice trays are forced into clamping engagement with the engaging members 118 and 119.

As may be understood particularly from FIGS. 13 and 14, the opposed ends of the support base 112 are provided with pairs of vertically aligned (as viewed in these FIGS.) inwardly extending V-shaped members 122 and 123 and 124 and 125. These V-shaped members are for receiving side portions of the optical fiber cables containing optical fibers having connections therebetween contained in the optical fiber splice tray or trays. Since these members are V-shaped, they can engage the side portions of optical fiber cables of different diameters. Referring to FIG. 17, it will be understood, from representative V-shaped member 122, that the V-shaped members include top and bottom portions 126 and 127, as viewed in FIG. 17, and that a pair of through holes 130 and 131 extend through the support base 112 adjacent these top and bottom portions. The through holes 130 and 131 are for receiving a portion of the circular clamping member of a pipe hose or pipe clamp such as the pipe hose or pipe clamp 98 shown in FIG. 11. The pipe hose or pipe clamp will clamp an optical fiber cable to the V-shaped member 122 to mount the optical fiber cable to the frame or support 110. As will be understood by reference to FIG. 18, the rearward portion 136 of the V-shaped member 122 is curved, generally semi-circular, to facilitate engagement with the circular clamping member of the above-noted pipe or hose clamp and thereby facilitate the clamping of the optical fiber cable to the V-shaped member.

Referring to FIG. 14, it will be understood that the support base 112 may be provided with a plurality of internal strength member mounting members 141, 142, 143 and 144 which may be the same as the internal strength member mounting members 88, 89, 90 and 91 shown in FIGS. 10 and 12. It will be understood that the internal strength member mounting members 141–144 are for mounting the internal strength members contained in the optical fiber cables clamped to the V-shaped members 122–125 as described above.

The frame or support 110 is for being mounted to a suitable support member such as, for example, the interior mounting wall 60 of the enclosure base 52 shown in FIGS. 10 and 12. It will be understood that the frame or support 110 may be suitably mounted to the interior mounting wall 60 by suitable mounting members such as, for example, the self-tapping bolts 39 shown in FIG. 6. Such bolts may be inserted through the through holes 150 and 151, FIG. 13, extending through the support base 112 and threaded into holes 153 and 154 provided in the interior mounting wall 60 of the enclosure base 52, FIG. 12. It will be understood that upon the frame or support 110 being mounted to the interior supporting wall 60 of the enclosure 50, FIG. 12, the combination frame or support 110 and enclosure 50 comprise a still further embodiment of the present invention.

Referring again to FIGS. 13 and 14, it will be understood that the base support 112 of the support 110 is provided with a plurality of laterally spaced and outwardly extending members 156, 157 and 158 having, respectively, outer edges 161, 162 and 163 for engaging the optical fiber splice tray 120, FIG. 14, to stabilize the position of the tray 120 between the clamping members 114 and 116. It will be understood that the outer edges 161, 162 and 163 reside in the same plane and which plane is substantially parallel to the base support 112 whereby upon the outer edges 161, 162 and 163 engaging the optical fiber splice tray 120, the members 156, 157 and 158 orients the tray substantially parallel to the base support 112 and thereby substantially parallel to the interior mounting wall 60 of the enclosure 50, FIG. 12, whereby the optical fiber splice trays (FIG. 15) clampingly received by the frame or support 110 are oriented substantially parallel to the enclosure interior mounting wall 60 for easy or ready enclosure within the enclosure 50.

Referring further to FIGS. 13, 14 and 15, it will be noted that the clamping members 114 and 116 are provided with respective openings or through holes 168 and 169 for receiving a VELCRO hook and loop strap 170 for strapping the optical fiber splice trays 120, as shown in FIG. 15, to the frame or support 110 after the trays are clamped between the clamping members 114 and 116 to further mount or secure the optical fiber splice trays to the frame or support 110.

The frame or support 110 may be made of suitable material such as, for example, polypropylene and may be made by suitable manufacturing techniques known to the art such as, for example, injection molding.

It will be further understood by those skilled in the art that many variations and modifications may be made in the present invention without departing from the spirit and scope thereof.

What is claimed is:

1. Apparatus for supporting at least one interconnection between at least one optical fiber contained in a first optical fiber cable and at least one optical fiber contained in at least a second optical fiber cable, at least the first optical fiber cable containing at least one internal tube containing a plurality of optical fibers and at least one internal strength member, comprising:

support means for supporting the at least one interconnection between the at least one optical fiber contained in the first optical fiber cable and the at least one optical fiber contained in the second optical fiber cable; and said support means provided with an indentation for receiving the at least one internal tube and the at least one internal strength member contained in the first optical fiber cable, said indentation extending transversely across the entirety of said support means and having open ends open to the exterior of said support means.

2. The apparatus according to claim 1 wherein the first optical fiber cable contains a central strength member and a plurality of buffer tubes each containing a plurality of optical fibers, and wherein said indentation is for receiving the plurality of buffer tubes and the central strength member contained in the first optical fiber cable.

3. The apparatus according to claim 1 wherein the first optical fiber cable includes a central core tube containing a plurality of optical fibers and a pair of internal strength members, and wherein said indentation is for receiving the central core tube and the pair of internal strength members.

4. The apparatus according to claim 1 wherein said support means is provided with routing means for receiving and routing optical fibers contained in the second optical fiber cable around said support means to store optical fibers contained in the second optical fiber cable on said support means.

5. The apparatus according to claim 4 wherein said routing means include a plurality of routing members and wherein said support means comprise a body including a lower portion providing a generally planar mounting wall, an upper portion providing a generally planar flange substantially planar with said mounting wall, and an intermediate portion intermediate said mounting wall and said flange and extending inwardly from said mounting wall and said flange to provide said indentation; and wherein a portion of said routing members are mounted on said mounting wall and a portion of said routing members are mounted on said flange.

6. The apparatus according to claim 1 wherein said apparatus further includes openable and closable enclosure means, said enclosure means including an interior mounting wall and wherein said support means is mounted to said interior mounting wall and wherein said enclosure means is for being fastened closed over said support means to provide mechanical and environmental protection to the support means and to the at least one interconnection between the at least one optical fiber contained in the first optical fiber cable and the at least one optical fiber contained in the second optical fiber cable.

7. The apparatus according to claim 6 wherein the second optical fiber cable contains a central strength member and a plurality of buffer tubes with each buffer tube containing a plurality of optical fibers, and wherein said interior mounting wall is provided with a plurality of second routing members for receiving the buffer tubes contained in the second optical fiber cable and for routing the buffer tubes contained in the second optical fiber cable around said interior wall to store the buffer tubes contained in said second optical fiber cable on said interior mounting wall.

8. The apparatus according to claim 6 wherein the second optical fiber cable includes a central core tube containing a plurality of optical fibers and wherein said interior mounting wall is provided with a plurality of second routing members for receiving the central core tube contained in the second optical fiber cable and for routing the central core tube around said interior mounting wall to store the central core tube contained in the second optical fiber cable on said interior mounting wall.

9. Apparatus for supporting interconnections between the optical fibers contained in an express optical fiber cable and optical fibers contained in a drop optical fiber cable, the express optical fiber cable and the drop optical fiber cable each containing at least one internal tube containing a plurality of optical fibers and at least one internal strength member, comprising:

support means for supporting interconnections between the optical fibers contained in the express optical fiber cable and optical fibers contained in the drop optical fiber cable; and said support means provided with a longitudinally extending indentation extending transversely across the entirety of said support means and having open ends open to the exterior of said support means, said indentation for receiving the at least one internal tube and the at least one internal strength member contained in the express optical fiber cable.

10. The apparatus according to claim 9 wherein the express optical fiber cable contains a central strength member and a plurality of buffer tubes each containing a plurality of optical fibers, and wherein said indentation is for receiving the central strength member and the plurality of buffer tubes contained in the express optical fiber cable.

11. The apparatus according to claim 9 wherein the drop optical fiber cable includes a pair of internal strength members and a central core tube containing a plurality of optical fibers and wherein said indentation is for receiving the pair of internal strength members and the central core tube.

12. The apparatus according to claim 9 wherein said support means is provided with routing means for receiving and routing optical fibers contained in the drop optical fiber cable around said support means to store optical fibers contained in the drop optical fiber cable on said support means.

13. The apparatus according to claim 12 wherein said routing means include a plurality of routing members and wherein said support means comprise a body including a generally lower portion providing a generally planar mounting wall, an upper portion providing a generally planar flange substantially planar with said mounting wall, and an intermediate portion intermediate said mounting wall and said flange and extending inwardly from said mounting wall and said flange to provide said indentation; and wherein a portion of said routing members are mounted on said mounting wall and a portion of said routing members are mounted on said flange.

14. The apparatus according to claim 9 wherein the interconnections between the optical fibers contained in the express optical fiber cable and the optical fibers contained in the drop optical fiber cable are fusion splices and wherein said support means further includes fusion splice organizer means provided with a plurality of substantially parallel indentations for receiving the fusion splices.

15. The apparatus according to claim 14 wherein said support means is provided with a mounting surface and wherein said fusion splice organizer means comprise a plurality of single fusion splice organizers mounted adhesively to said mounting surface.

16. The apparatus according to claim 9 wherein said support means includes optical fiber connector mounting means for receiving and mounting a plurality of optical fiber connectors each for interconnecting an optical fiber contained in the express optical fiber cable and an optical fiber contained in the drop optical fiber cable.

17. The apparatus according to claim 16 wherein said support means includes a support wall provided with first mounting means and wherein said optical fiber connector mounting means comprise a plurality of bulkhead members provided with second mounting means for cooperating with said first mounting means to mount said plurality of bulkhead members to said support wall, and wherein said bulkhead members are provided with a plurality of openings for wedgedly receiving the optical fiber connectors.

18. The apparatus according to claim 17 wherein said first mounting means comprise pairs of staggered openings and wherein said second mounting means comprise pairs of staggered mounting members for being inserted into said pairs of staggered openings and wedged into engagement with said support wall.

19. The apparatus according to claim 9 wherein said apparatus further comprise openable and closable enclosure means including an interior mounting wall and wherein said support means is mounted to said interior mounting wall, said enclosure means for being fastened closed over said support means to provide said support means and said interconnections with mechanical and environmental protection.

20. The apparatus according to claim 19 wherein said enclosure means includes a base member provided with said interior mounting wall and wherein said interior mounting wall is provided with second routing means for receiving and routing around said interior mounting wall the internal tubes contained in the drop optical fiber cable to store the internal tubes contained in the drop optical fiber cable on said interior mounting wall.

21. The apparatus according to claim 20 wherein said enclosure means is provided with strand mounting means for mounting said enclosure means aerially to a metal cable or strand extending between poles.

22. The apparatus according to claim 20 wherein the express optical fiber cable and the drop optical fiber cable each includes an internal strength member and wherein said interior mounting wall is provided with internal strength member mounting means for mounting the internal strength members to said interior mounting wall.

23. The apparatus according to claim 20 wherein the express optical fiber cable and the drop optical fiber cable each includes an outer protective sheath and wherein said interior mounting wall is provided with outer protective sheath mounting means for surrounding and gripping the outer protective sheaths to mount the express optical fiber cable and the drop optical fiber cable to said interior mounting wall.

24. Assembly or kit of apparatus for supporting at least one interconnection between at least one optical fiber contained in a first optical fiber cable and at least one optical fiber contained in at least a second optical fiber cable, at least the first optical fiber cable containing at least one internal tube containing a plurality of optical fibers and at least one internal strength member, comprising:

a frame for supporting the at least one interconnection between the at least one optical fiber contained in the first optical fiber cable and the at least one optical fiber contained in the second optical fiber cable, said frame provided with an indentation for receiving the at least one internal tube and the at least one internal strength member contained in the first optical fiber cable, said indentation extending transversely across the entirety of said frame and having open ends open to the exterior of said frame;

routing members mountable to said frame for receiving and routing optical fibers contained in the second optical fiber cable and for storing the optical fibers contained in the second optical fiber cable on said frame;

at least one fusion splice organizer mountable to said frame and provided with a plurality of substantially parallel indentations for receiving at least one fusion splice between at least one optical fiber contained in the first optical fiber cable and at least one optical fiber contained in the second optical fiber cable;

at least one bulkhead member provided with at least one opening for wedgedly receiving and mounting at least one optical fiber connector for interconnecting at least one optical fiber contained in the first optical fiber cable and at least one optical fiber contained in the second optical fiber cable;

at least one first fastener for fastening said bulkhead member to said frame; and at least one second fastener for fastening said frame to a support member.

25. The assembly or kit according to claim 24 wherein said assembly or kit further comprises a container for receiving and containing said at least one fusion splice organizer, said at least one bulkhead member, said at least one first fastener and said at least one second fastener.

26. The assembly or kit according to claim 24 wherein said frame is provided with at least a first pair of staggered openings and wherein said at least one bulkhead member is provided with a pair of staggered mounting members for being inserted into said at least first pair of staggered openings and wedged into engagement with said frame to mount said at least one bulkhead member to said frame.

27. The assembly or kit according to claim 24 wherein said frame includes a body including a lower portion providing a substantially planar mounting wall, an upper portion providing a substantially planar flange substantially planar with said mounting wall, and an intermediate portion intermediate said lower and upper portions and extending inwardly therefrom to provide said indentation.

28. Apparatus for supporting and containing interconnections between a first optical fiber cable and a second optical fiber cable and wherein at least the first optical fiber cable contains at least one internal tube containing a plurality of optical fibers and at least one internal strength member, comprising:

enclosure means including a base and a cover for being fastened closed over said base, said base including opposed ends, each end provided with a pair of entry/exit ports including self-sizing grommets for sealingly engaging optical fiber cables entering and exiting said entry/exit ports, and said base provided with an interior mounting wall; and support means mounted to said interior mounting wall for supporting interconnections between optical fibers contained in the optical fiber cables, said support means provided with an indentation for receiving the at least one internal tube and the at least one internal strength member and said indentation extending transversely across the entirety of said support means and having open ends open to the exterior of said support means.

29. The apparatus according to claim 28 wherein the first optical fiber cable includes a central core tube containing a plurality of optical fibers and a pair of internal strength members, and wherein said indentation is for receiving the central core tube and the pair of internal strength members.

30. The apparatus according to claim 28 wherein said support means is provided with routing means for receiving and routing optical fibers contained in one or more of the optical fiber cables around said support means to store the optical fibers on said support means.

31. The apparatus according to claim 30 wherein said routing means include a plurality of routing members and wherein said support means comprise a body including a lower portion providing a generally planar mounting wall, an upper portion providing a generally planar flange substantially planar with said mounting wall, and an intermediate portion intermediate said generally planar mounting wall and said flange and extending inwardly from said generally planar mounting wall and said flange to provide an indentation for receiving optical fibers contained in at least one of the optical fiber cables; and wherein a portion of said routing members are mounted on said generally planar mounting wall and a portion of said routing members are mounted on said flange.

32. The apparatus according to claim 28 wherein one of the optical fiber cables contains a central strength member and a plurality of buffer tubes with each buffer tube containing a plurality of optical fibers, and wherein said interior mounting wall is provided with a plurality of second routing members for receiving the buffer tubes and for routing the buffer tubes around and storing the buffer tubes on said interior mounting wall.

33. The apparatus according to claim 28 wherein the interconnections between optical fibers are contained in at least one optical fiber splice tray, and wherein said support means is provided with clamping means for clamping the at least one optical fiber splice tray to said support means.

34. The apparatus according to claim 33 wherein the interconnections between optical fibers are contained in a plurality of optical fiber splice trays, wherein said support means includes a support base, and wherein said clamping means include a pair of opposed flexible clamping members extending outwardly from said support base and spaced apart sufficiently to receive said optical fiber splice trays in clamping engagement.

35. The apparatus according to claim 34 wherein said clamping members are provided with at least one pair of opposed spaced apart engaging members for engaging the optical fiber splice trays in said clamping engagement, and wherein said engaging members extend inwardly towards each other and taper inwardly outwardly from said support base to cause said engaging members to engage the plurality of optical fiber support trays in clamping engagement as said clamping members flex outwardly away from each other upon receipt of the plurality of optical fiber splice trays.

36. The apparatus according to claim 35 wherein said clamping members are provided with two pairs of said engaging members.

37. Apparatus for supporting interconnections between optical fibers contained in a plurality of optical fiber splice trays, comprising:

support means including a support base;

clamping means mounted on said support base and said clamping means including a pair of opposed flexible clamping members extending outwardly from said support base and spaced apart sufficiently to receive the plurality of optical fiber splice trays therebetween in wedged clamping engagement, said clamping members provided with at least one pair of opposed spaced apart engaging members for engaging the optical fiber splice trays in said clamping engagement, and wherein said engaging members extend inwardly towards each other and taper downwardly outwardly from said support base to cause said engaging members to engage the plurality of optical fiber splice trays in clamping engagement as said clamping members flex outwardly away from each other upon receipt of the plurality of optical fiber splice trays.

38. The apparatus according to claim 37 wherein said clamping members are provided with two pairs of said engaging members.

39. The apparatus according to claim 37 wherein said support base is provided with a plurality of routing members for receiving and storing on said base optical fibers between which the interconnections contained in the at least one optical fiber splice tray are made.

40. The apparatus according to claim 37 wherein said support base includes opposed ends and wherein each end is provided with a pair of vertically aligned and inwardly extending V-shaped members for receiving optical fiber cables of different diameters, the optical fiber cables containing optical fibers between which the interconnections contained in the at least one optical fiber splice tray are made.

41. The apparatus according to claim 40 wherein each of said V-shaped members includes top and bottom portions and wherein through holes are provided through said support base adjacent said top and bottom portions, said through holes for receiving a pipe clamp for clamping an optical fiber member residing in the V-shaped member to the support base.

42. The apparatus according to claim 41 wherein the pipe clamp includes a circular clamping member and wherein said V-shaped member includes a curved, generally semicircular, rearward portion for engagement by a portion of the circular clamping member to facilitate clamping of an optical fiber cable to said V-shaped member by the pipe clamp.

43. The apparatus according to claim 37 wherein said support means is provided with mounting means for mounting said support means to a support member.

44. The apparatus according to claim 43 wherein said mounting means include at least one pair of openings extending through said support base and at least a pair of self-tapping screws for extending through said pair of openings and mounting said support means to the support member.

45. The apparatus according to claim 37 wherein the optical fibers are contained in optical fiber cables each including at least one internal strength member, and wherein said support base is provided with at least two internal strength member mounting members for mounting the internal strength members to said support base.

46. The apparatus according to claim 37 wherein said support base is provided with a plurality of laterally spaced and outwardly extending clamping members provided with edges residing in the same plane and substantially parallel to said support base, said edges for engaging the at least one optical fiber splice tray and for stabilizing the at least one optical fiber splice tray upon being clamped between said clamping members and to facilitate orientation of said at least one optical fiber splice tray in a substantially parallel orientation with said support base.

47. Apparatus according to claim 37 wherein said clamping members are provided with through holes for receiving a mounting strap for encircling and mounting said at least one optical fiber splice tray to said support means upon said at least one optical fiber splice tray being clamped between said clamping members.

* * * * *